United States Patent [19]
Shoge

[11] Patent Number: 5,829,563
[45] Date of Patent: Nov. 3, 1998

[54] INTERNAL BICYCLE TRANSMISSION WITH A COASTER BRAKE

[75] Inventor: Akihiko Shoge, Shimonoseki, Japan

[73] Assignee: Shimano, Inc., Osaka, Japan

[21] Appl. No.: 806,903

[22] Filed: Feb. 26, 1997

[30] Foreign Application Priority Data

Mar. 15, 1996 [JP] Japan ..................................... 8-058784

[51] Int. Cl.⁶ .................................................. B60K 41/26
[52] U.S. Cl. ........................................... 192/6 A; 475/298
[58] Field of Search ........................... 192/6 A; 475/297, 475/298

[56] References Cited

U.S. PATENT DOCUMENTS

| | | | |
|---|---|---|---|
| 3,937,309 | 2/1976 | Schulz et al. | 192/6 A |
| 4,721,013 | 1/1988 | Steuer et al. | 192/6 A X |
| 4,973,297 | 11/1990 | Bergles | 192/6 A X |
| 5,078,664 | 1/1992 | Nagano | 475/297 |
| 5,445,573 | 8/1995 | Nurnberger | 475/297 X |

*Primary Examiner*—Rodney H. Bonck
*Attorney, Agent, or Firm*—James A. Deland

[57] ABSTRACT

A hub transmission with a coaster brake unit includes a hub axle, a drive member rotatably mounted around the hub axle, a hub body rotatably mounted around the hub axle, and a planetary gear mechanism coupled between the drive member and the hub body for communicating rotational force from the drive member to the hub body through multiple rotational force transmission paths. The planetary gear mechanism includes a planet gear supported by a planet gear rack for rotation around the hub axle, and a ring gear engaging the planet gear. The gear rack includes a depression formed in a peripheral direction thereof, and the ring gear includes a serration formed in a peripheral direction thereof. A clutch having an engagement component is movable in a direction of an axis of the axle between a first position and a second position. The engagement component engages with the depression in the gear rack for transmitting forward rotational power to the gear rack when the clutch is located in the first position, and the engagement component engages with the serration in the ring gear for transmitting forward rotational power to the ring gear when the clutch is located in the second position. A forcible movement device forcibly moves the clutch from the depression toward the serration when reverse rotational power is applied to the drive member.

31 Claims, 12 Drawing Sheets

FIG. 10
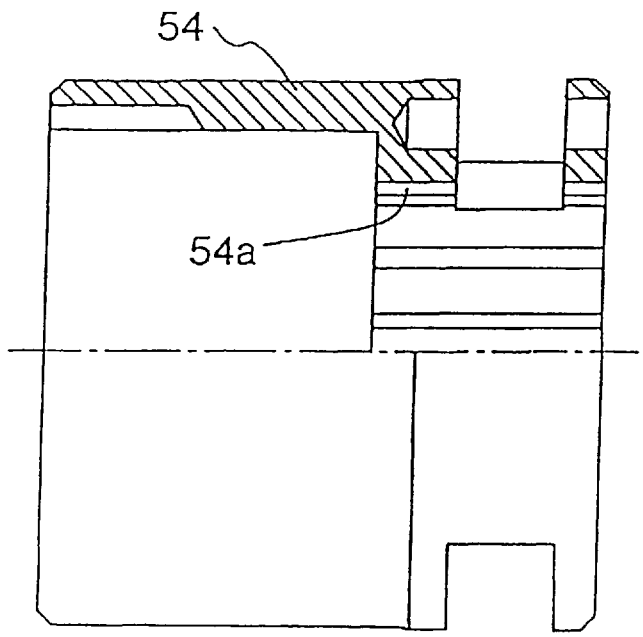
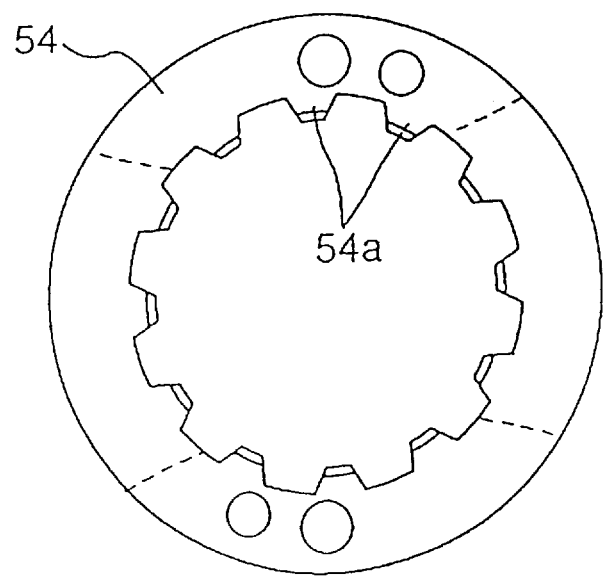
FIG. 11

FIG. 12
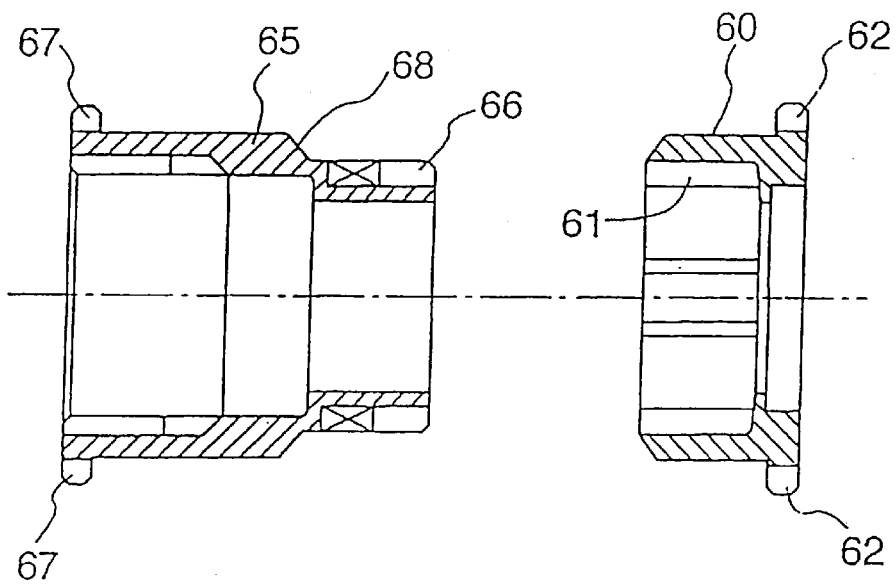
FIG. 13
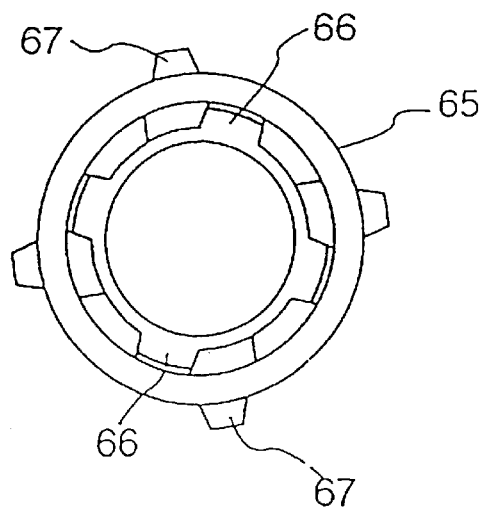
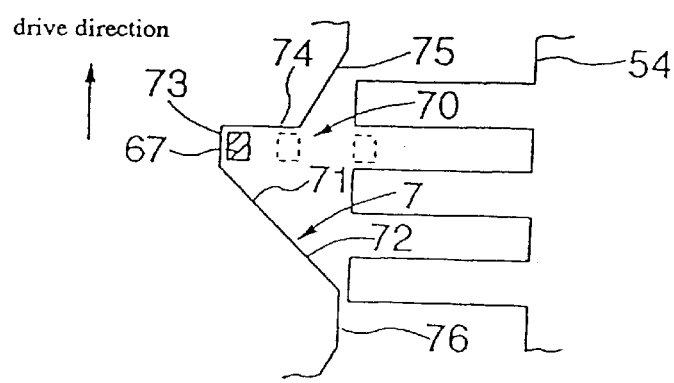
FIG. 14

INTERNAL BICYCLE TRANSMISSION WITH A COASTER BRAKE

BACKGROUND OF THE INVENTION

The present invention is directed to bicycle transmissions and, more particularly, to an internal bicycle transmission which includes a coaster brake unit.

An internally mounted bicycle transmission which includes a coaster brake unit is disclosed in U.S. Pat. No. 3,937,309. This internal hub includes a hub axle, a drive member rotatably mounted around the hub axle, a hub body rotatably mounted around the hub axle, and a planetary gear mechanism coupled between the drive member and the hub body for communicating rotational force from the drive member to the hub body through multiple rotational force transmission paths. The planetary gear mechanism includes a planet gear supported by a planet gear rack for rotation around the hub axle, and a ring gear engaging the planet gear. The transmission provides three speeds depending upon the axial position of a clutch unit that is coupled to a driving member. More specifically, a high speed is provided when the clutch is linked to the gear rack such that the forward rotational power from the driver is transmitted from the planet gear attached to the gear rack to the hub body via the ring gear. A medium speed is provided when the clutch body is linked to the ring gear and the forward rotational power from the driver is transmitted from the ring gear directly to the hub body. A low speed step is provided when the clutch body is linked to the ring gear and the forward rotational power from the driver is transmitted to the hub body the ring gear, the planet gear, and the gear rack.

Such transmissions ordinarily include a coaster brake unit, wherein the reverse rotational power from the driver causes a brake cone provided to the gear rack to move in the axial direction. This movement of the brake cone in the axial direction causes a brake shoe to expand, thus producing a braking action. Unfortunately, the reverse rotational power from the driver must proceed through the same transmission path used for forward rotation of the driver. Thus, for a given force applied to the pedals in the braking direction, a different braking force will be applied to the wheel depending on the transmission path selected at the time of braking. As a result, there is a risk that the resulting braking force applied to the wheel will be different from what the rider intended and may be insufficient or too much.

SUMMARY OF THE INVENTION

The present invention is directed to an internally mounted bicycle transmission which includes a coaster brake unit wherein the braking force applied to the wheels is the same regardless of the selected transmission path. In one embodiment of the present invention, a hub transmission with a coaster brake unit includes a hub axle, a drive member rotatably mounted around the hub axle, a hub body rotatably mounted around the hub axle, and a planetary gear mechanism coupled between the drive member and the hub body for communicating rotational force from the drive member to the hub body through multiple rotational force transmission paths. The planetary gear mechanism includes a planet gear supported by a planet gear rack for rotation around the hub axle, and a ring gear engaging the planet gear. The gear rack includes a depression formed in a peripheral direction thereof, and the ring gear includes a serration formed in a peripheral direction thereof. A clutch having an engagement component is movable in a direction of an axis of the axle between a first position and a second position. The engagement component engages with the depression in the gear rack for transmitting forward rotational power to the gear rack when the clutch is located in the first position, and the engagement component engages with the serration in the ring gear for transmitting forward rotational power to the ring gear when the clutch is located in the second position. A forcible movement means forcibly moves the clutch from the depression toward the serration when reverse rotational power is applied to the drive member.

In a more specific embodiment, the depression is defined by a side surface and a bottom surface formed on an annular portion of the gear rack. The forcible movement means is formed by an inclined surface located adjacent to the bottom surface of the depression for contacting the engagement component and pushing the clutch toward the serration when reverse rotational power is applied to the drive member. As a result, reverse rotational power always is directly applied to the ring gear to produce the same braking force to the coaster brake regardless of the transmission path selected.

BRIEF DESCRIPTION OF THE DRAWINGS

FIG. 10 is a cross sectional side view of a particular embodiment of a ring gear used in the transmission shown in FIG. 1;

FIG. 11 is a plan view of the ring gear shown in FIG. 10;

FIG. 12 is a cross sectional side view of a particular embodiment of a clutch body used in the transmission shown in FIG. 1;

FIG. 13 is a plan view of the clutch body shown in FIG. 12;

FIG. 14 is a detailed view of an alternative embodiment of an inclined surface;

DETAILED DESCRIPTION OF THE EMBODIMENTS

Figure 1:
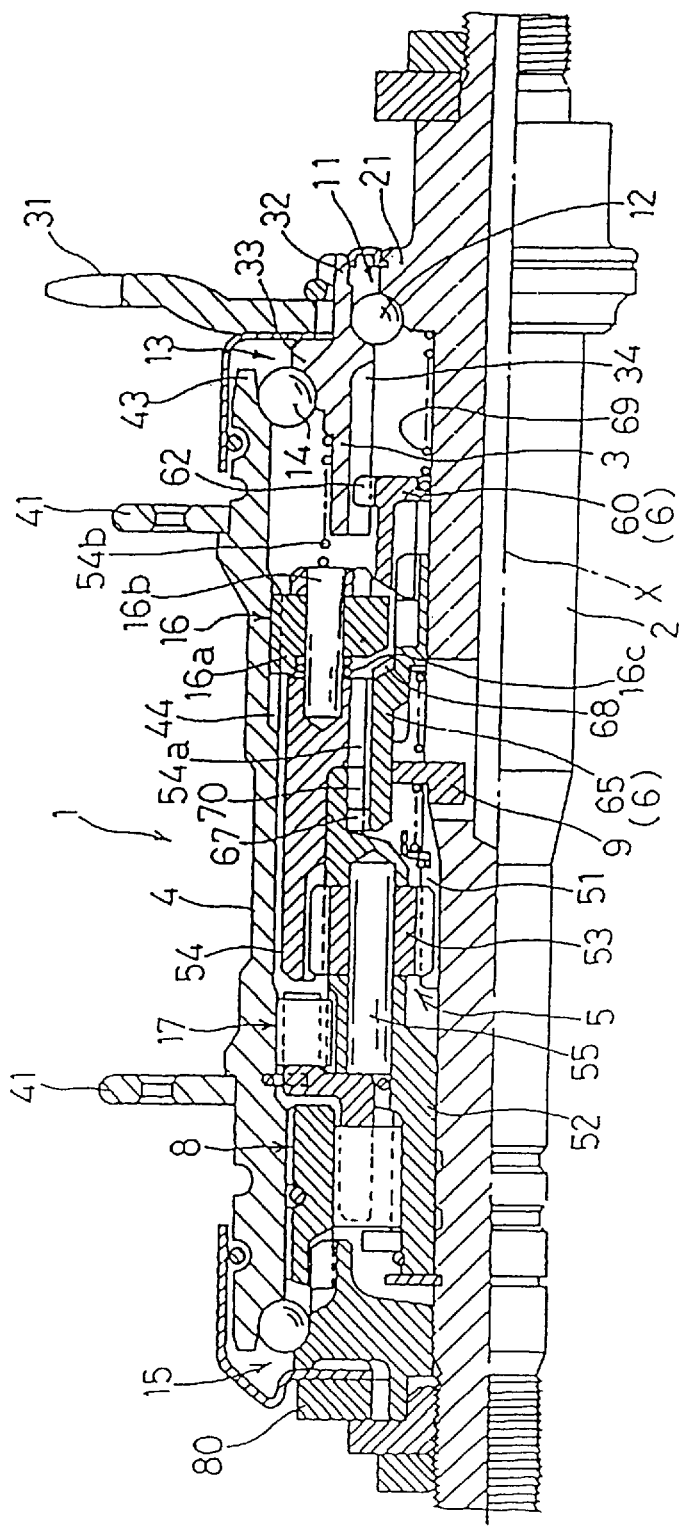
FIG. 1 is a partial cross sectional view of a particular embodiment of an internally mounted bicycle transmission which includes a coaster brake unit according to the present invention.

FIG. 1 is a partial cross sectional view of a particular embodiment of an internally mounted bicycle transmission which includes a coaster brake unit according to the present invention. The transmission 1 comprises a hub axle 2 that is fixed to the bicycle frame and has an axis X; a driver 3 and a hub body 4 that are supported by the hub axle 2 such that they can rotate about the axis X; a planet gear mechanism 5 that transmits power between the driver 3 and the hub body 4; a clutch body 6 that selectively switches the power transmission path between the driver 3 and the hub body 4 used by planet gear mechanism 5; and a roller brake 8, which is itself known as a coaster brake unit.

The driver 3, which functions as the input component for this internal hub transmission 1, has provided around its outer peripheral surface a sprocket 31 that receives the power transmitted by a chain. Further, the internal hub transmission 1 is equipped with a first ball bearing mechanism 11 comprising an outer race 32 formed around the inner peripheral surface of the driver 3 between the driver 3 and the hub axle 2, an inner race 21 formed in the hub axle 2, and balls 12 positioned between these two races.

The hub body 4, which functions as the output component for this internal hub transmission 1, has formed around its outer peripheral surface a pair of hub flanges 41 that are used to link the spokes (not shown) of a bicycle wheel. Further, the internal hub transmission 1 is equipped with a second ball bearing mechanism 13 comprising an outer race 43 formed around the inner peripheral surface of the hub body 4 between the hub body 4 and the driver 3, an inner race 33 formed around the outer peripheral surface of the driver 3, and balls 14 positioned between these two races. A similar third ball bearing mechanism 15 is provided between the hub body 4 and a brake arm 80 that is fixed to the hub axle 2.

The planet gear mechanism 5 is made up of a sun gear 51 formed around the outer peripheral surface of the hub axle, three planet gears 53 arranged in the peripheral direction so as to mesh with this sun gear 51, a cylindrical gear rack 52 that makes use of a gear shaft 55 to rotatably support these planet gears 53, and a ring gear 54 that meshes with these planet gears 53. The details of the gear rack 52 are shown in FIGS. 10 and 11.

The ring gear 54 is constructed such that it can move along the axis X, and it is energized by a coil spring 54b toward the gear rack 52. One end of the ring gear 54 is provided with a pawl clutch 16 that functions as a one-way clutch that transmits rotation in the drive direction of the bicycle. This pawl clutch 16 is itself known, and it is made up of an oscillating pawl 16a that meshes with a ratchet 44 formed around the inner peripheral surface of the hub body 4, a support pin 16b that oscillatably attaches this oscillating pawl 16a to the ring gear 54, and a pawl spring 16c that energizes this oscillating pawl 16a in the engagement direction. A roller clutch 17 that functions as a one-way clutch that transmits rotation in the drive direction of the bicycle is provided between the gear rack 52 and the hub body 4. In other words, the transmission of power from the planet gear mechanism 5 to the hub body 4 goes through two paths, namely, a transmission path from the ring gear 54 to the hub body 4 via the pawl clutch 16, and a transmission path from the gear rack 52 to the hub body 4 via the roller clutch 17.

The switching between the above-mentioned two transmission paths is performed by the clutch body 6. Clutch body 6 may be set to a first position, an intermediate position, and a second position in the direction of the axis X using a clutch operator 9 that is connected to a shifter unit by means of a shift cable (not shown). To this end, the clutch body 6 is able to move along the axis X and is able to rotate on the hub axle 2. The clutch body 6 in this embodiment comprises a first clutch member 60 and a second clutch member 65 as shown in FIGS. 12 and 13. In order for the two members to be linked such that torque transmission is possible, an inner spline component 61 is provided to one end of the first clutch member 60, an outer spline component 66 is provided to one end of the second clutch member 66, and the engagement of these spline components 61 and 66 integrates the two members 60 and 65 such that torque transmission is possible. The other end of the first clutch member 60 is provided with an outer spline component 62 that engages with an inner spline component 34 formed around the inner peripheral surface of the driver 3. As a result, the first clutch member 60 rotates integrally with driver 3 and is able to slide in the direction of the axis X with respect to the driver 3.

A step 68 that interacts with the oscillating pawl 16a is provided around the outer peripheral surface of the second clutch member 65. This step 68 acts on the oscillating pawl 16a and knocks it down when the clutch body 6 moves to the right from the first position and reaches the intermediate position, which disengages the oscillating pawl 16a and the ratchet 44. The shape of this step 68 is designed such that the step 68 will act on the oscillating pawl 16a within the range of movement of the clutch body 6 from the intermediate position to the second position, and will keep the oscillating pawl 16a lying down.

Four engagement components 67 that project outward in the radial direction are arranged in the peripheral direction at the other end of the second clutch member 65. These engagement components 67 engage with twelve serrations 54a in the form of axial grooves formed and arranged in the peripheral direction around the inner peripheral surface of the ring gear 54, or with four depressions 70 in the form of axial grooves formed and arranged in the peripheral direction around the inner peripheral surface of the gear rack. More specifically, the engagement components 67 are engaged with the depressions 70 of the gear rack when the clutch body 6 is positioned at the first position and the intermediate position, and the engagement components 67 are engaged with the serrations 54a of the ring gear 54 when the clutch body 6 is moved to the right (in FIG. 1) and positioned in the second position.

Figure 5:
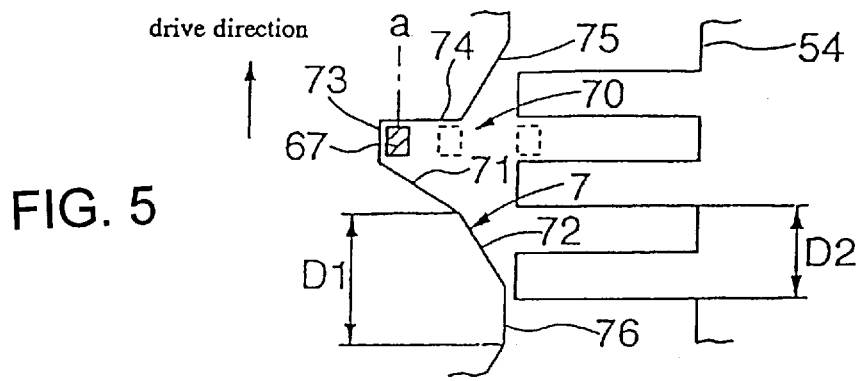
FIG. 5 is a detailed diagram showing the position of an engagement component of a clutch in relation to a depression formed in the gear rack and a serration formed in a ring gear when the transmission is in a high speed state.
Figure 6:
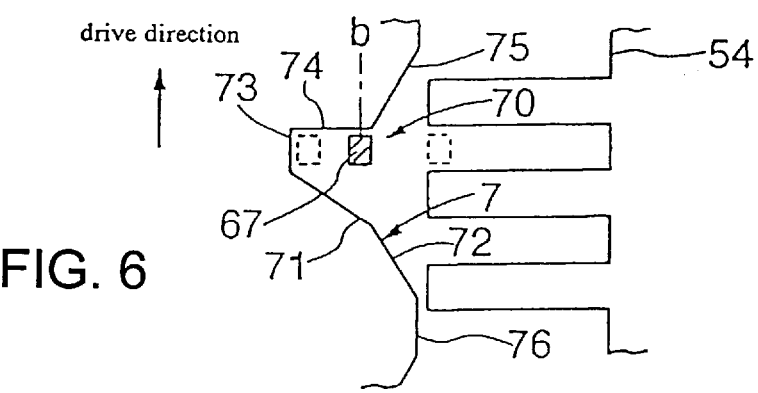
FIG. 6 is a detailed diagram showing the position of an engagement component of a clutch in relation to a depression formed in the gear rack and a serration formed in a ring gear when the transmission is in a medium speed state.
Figure 7:
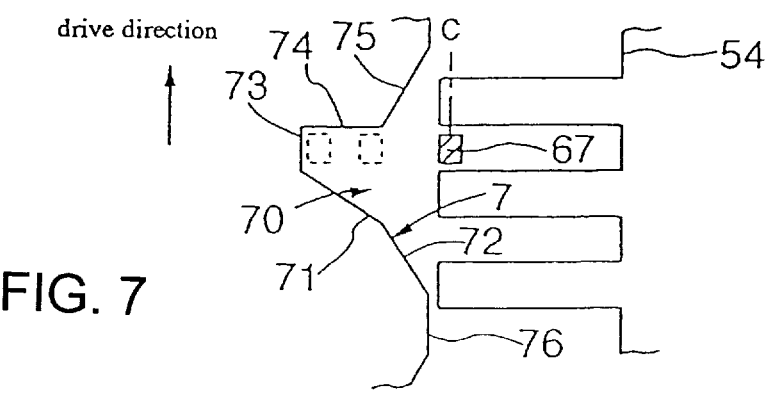
FIG. 7 is a detailed diagram showing the position of an engagement component of a clutch in relation to a depression formed in the gear rack and a serration formed in a ring gear when the transmission is in a low speed state.
Figure 8:
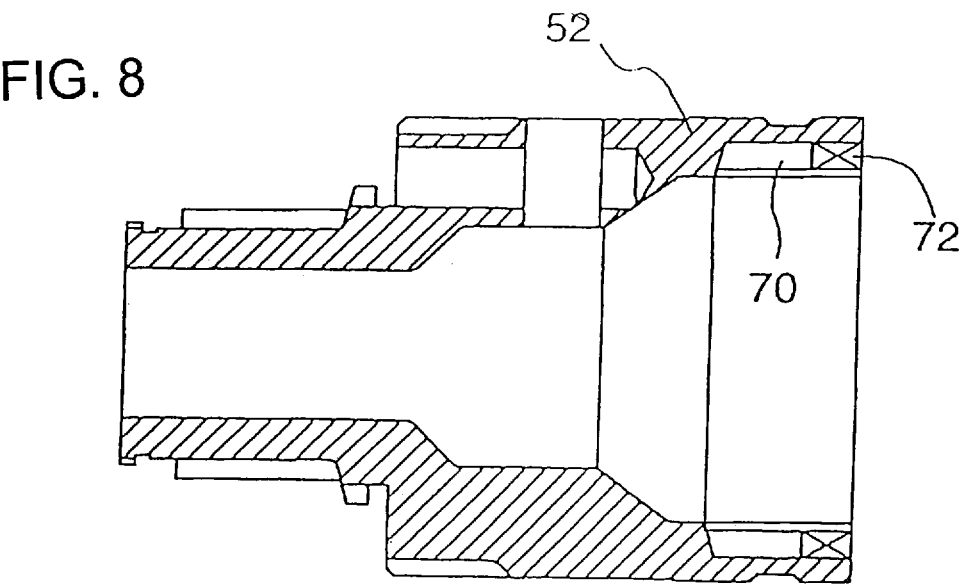
FIG. 8 is a cross sectional side view of a particular embodiment of a gear rack used in the transmission shown in FIG. 1.
Figure 9:
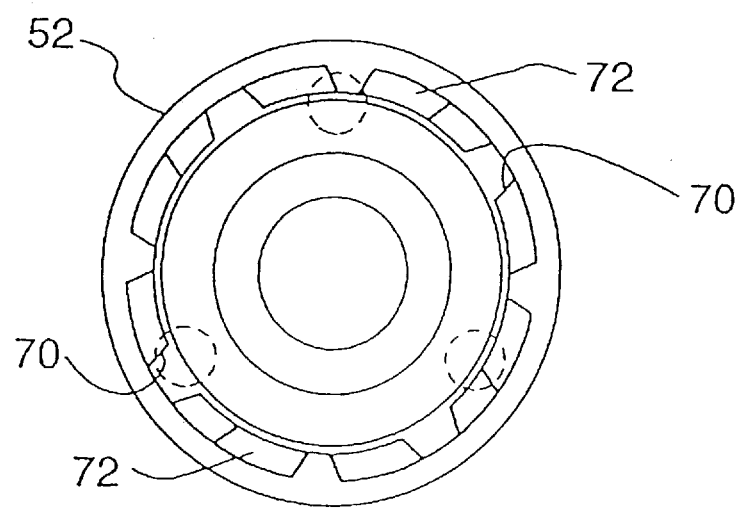
FIG. 9 is a plan view of the gear rack shown in FIG. 8.

The relation between the serrations 54a of the ring gear 54, the depressions 70 of the gear rack, and the engagement components 67 of the clutch body 6 will be described through reference to FIGS. 5 through 7. These figures are schematic diagrams used for description, and although the shapes of the depressions 70 and the serrations 54a are actually such that they are disposed in the peripheral direction, they are shown here in developed form. The arrows in the figures indicate the drive direction of the bicycle. Rotation in this direction is often called forward rotation in this specification, and rotation in the opposite direction is called reverse rotation.

The depression 70 is essentially formed from the first inclined surface 71 and second inclined surface 72 that make up the side surfaces on the reverse rotational direction side, the side surface 74 on the forward rotational side, the bottom surface 73, the attachment component 75, and the flat surface 76 of the distal end. The first inclined surface 71 and the second inclined surface 72 make up the inclined guide surface 7 that serves as the forced movement means, which is discussed in detail below. When the clutch body 6 is positioned at the first position, the engagement component 67 comes into contact with the gear rack 52 at the position a indicated by the solid line in FIG. 5, and the forward rotational power of the driver 3 is transmitted to the gear rack 52. When the clutch body 6 is positioned at the intermediate position, the engagement component 67 comes into contact with the gear rack 52 at the position b indicated by the solid line in FIG. 6, and the forward rotational power of the driver 3 is transmitted to the gear rack 52. When the clutch body 6 is positioned at the second position, the engagement component 67 comes into contact with the ring gear 54 at the position c indicated by the solid line in FIG. 7, and the forward rotational power of the driver 3 is transmitted to the ring gear 54.

In a state in which the engagement component 67 is in contact with the gear rack 52, when the pedal is turned backward for braking, and as a result the engagement component 67 is rotated in the direction opposite that of the drive, the engagement component 67 comes into contact with the first inclined surface 71, the inclination of which causes the engagement component 67 to slide along the axial direction toward the ring gear 54. When it slides all the way to the second inclined surface 72, it comes into contact with the ring gear 54, and in some cases slides until it enters the flat component 76 and is in a phase relationship in which it matches up with the serration 54a, and finally it enters the serration 54a and transmits the reverse rotational power of the driver 3 to the ring gear 54. Since a phase relationship in which the engagement component 67 matches up with the serration 54a is obtained while the engagement component 67 is sliding over the second inclined surface 72 and the flat component 76, the peripheral direction distance D1 of the second inclined surface 72 and the flat component 76 is set so as to be greater than the peripheral direction pitch D2 of the serrations 54a. In this practical example, the inclination angle of the second inclined surface 72 is set so as to be greater than the inclination angle of the first inclined surface 71, but if there is enough space in the peripheral direction distribution of the depressions, then the inclination angle of the second inclined surface 72 and the inclination angle of the first inclined surface 71 may be the same, as shown in FIG. 14.

The operation of the three-speed internal hub with a coaster brake unit in the embodiment discussed above will now be described.

Figure 2:
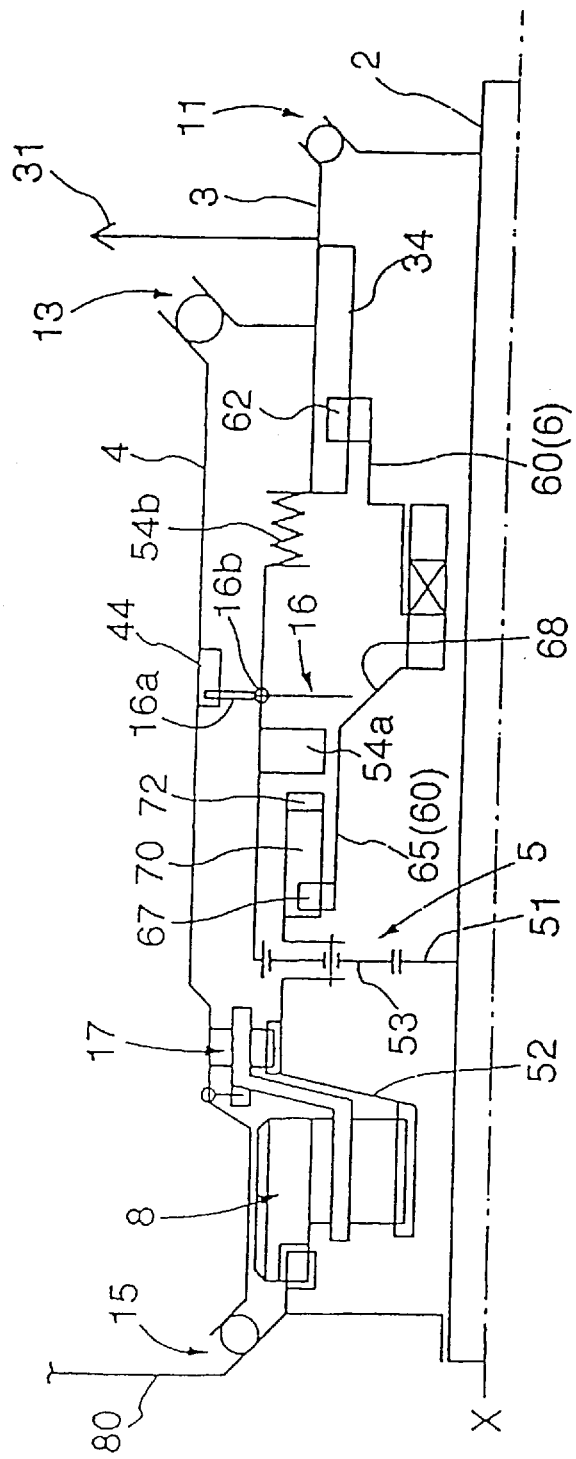
FIG. 2 is a schematic view of the transmission shown in FIG. 1 in a high speed state.

The high speed step can be realized by setting the clutch body 6 to the first position. This state is shown in FIGS. 2 and 5. The forward rotational power received by the driver 3 through the chain is transmitted via the clutch body 6 to the gear rack 52, which is engaged with the engagement component 67 of the clutch body 6. Since the oscillating pawl 16a of the pawl clutch 16 is engaged with the ratchet 44 by the pawl spring 16c, the forward rotational power imparted to the gear rack 52 is boosted through the work of the planet gears 53 and the sun gear 51 before being transmitted to the ring gear 54, and is then transmitted to the hub body 4 through the pawl clutch 16. Since the speed of the hub body 4 is greater than the speed of the gear rack 52, the roller clutch 17 overruns. When the pedal is turned backward in this state in order to brake, the engagement component 67 hits the first inclined surface 71 of the inclined guide surface 7 formed in the depression 70, slides this over first inclined surface 71, keeps sliding until it reaches the second inclined surface 72, and then enters the serrations 54a of the ring gear 54. Once in the serrations 54a, the engagement component 67 transmits the reverse rotational power to the ring gear 54, and this reverse rotational power is further transmitted to the gear rack 52 via the planet gears 53. When the gear rack 52 is driven backward, the roller clutch 17 is actuated and the hub body is braked.

Figure 3:
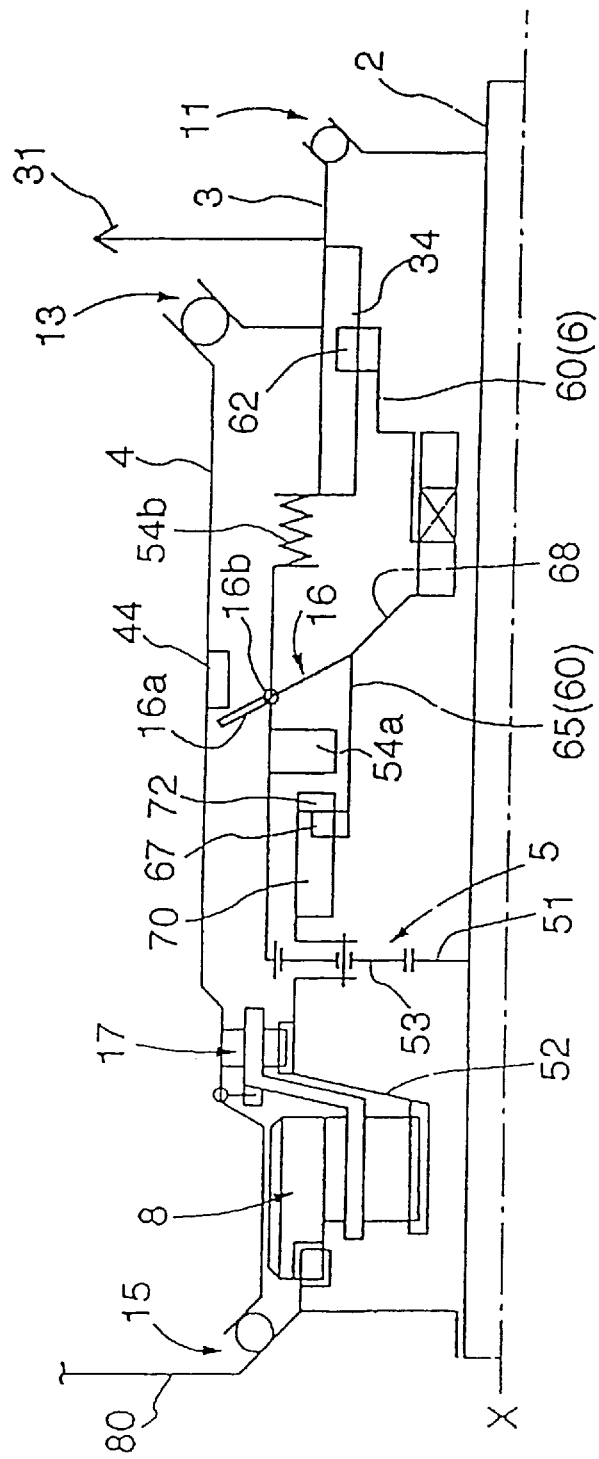
FIG. 3 is a schematic view of the transmission shown in FIG. 1 in a medium speed state.

The medium speed step can be realized by setting the clutch body 6 to an intermediate position located between the first position and the second position. This state is shown in FIGS. 3 and 6. The forward rotational power received by the driver 3 through the chain is transmitted via the clutch body 6 to the gear rack 52, which is still engaged with the engagement component 67 of the clutch body 6. Since the oscillating pawl 16a of the pawl clutch 16 has been separated from the ratchet 44 by the step 68 of the second clutch member 65, the forward rotational power imparted to the gear rack 52 is transmitted directly as it is to the hub body 4 via the roller clutch 17. When the pedal is turned backward in this state in order to brake, the engagement component 67 hits the first inclined surface 71 of the inclined guide surface 7 formed in the depression 70, just as in the high speed step, slides over this first inclined surface 71, keeps sliding until it reaches the second inclined surface, and enters the serrations 54a of the ring gear 54. Once in the serrations 54a, the engagement component 67 transmits the reverse rotational power to the ring gear 54, and this reverse rotational power is further transmitted to the gear rack 52 via the planet gears 53, the roller clutch 17 is actuated, and the hub body is braked.

Figure 4:
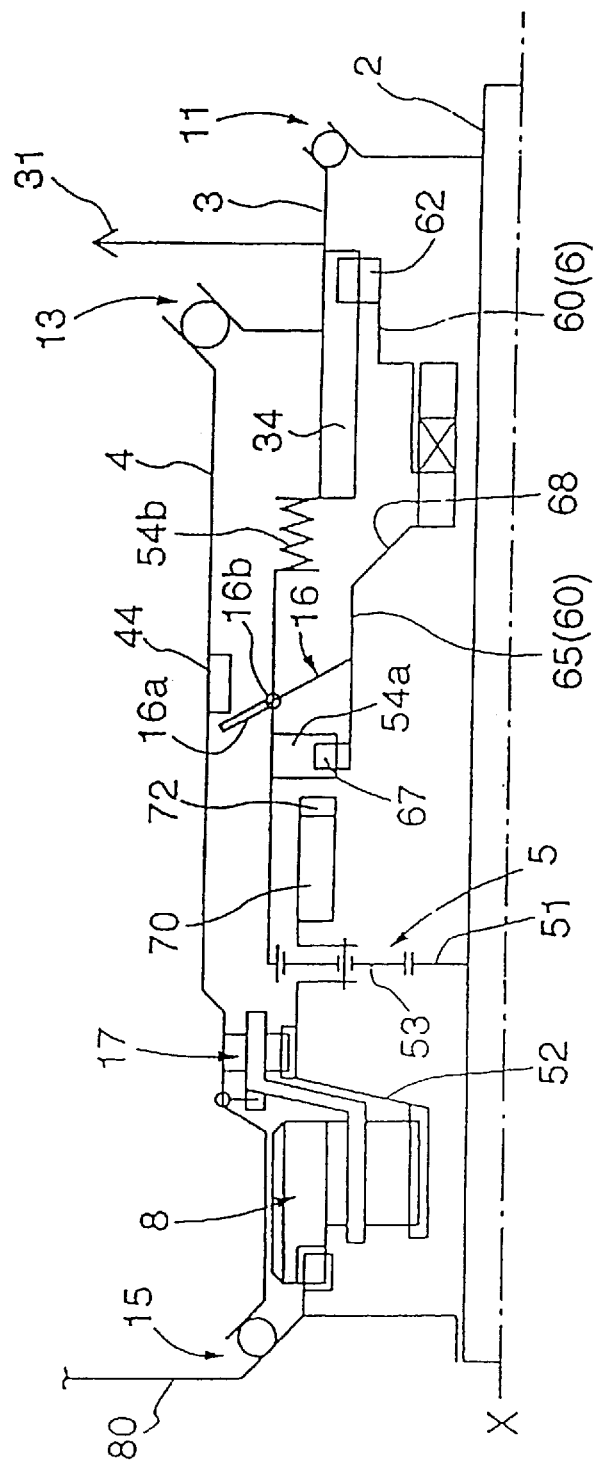
FIG. 4 is a schematic view of the transmission shown in FIG. 1 in a low speed state.

The low speed step can be realized by setting the clutch body 6 to the second position. This state is shown in FIGS. 4 and 7. The forward rotational power received by the driver 3 through the chain is transmitted via the clutch body 6 to the ring gear 54, which is engaged with the engagement component 67 of the clutch body 6. Since the oscillating pawl 16a of the pawl clutch 16 is still separated from the ratchet 44 by the step 68 of the second clutch member 65, the forward rotational power imparted to the ring gear 54 is decreased through the work of the planet gears 53 and the sun gear 51 before being transmitted to the gear rack 52, and is then transmitted to the hub body 4 through the roller clutch 17. When the pedal is turned backward in this state in order to brake, the engagement component 67, which has already entered the serrations 54a of the ring gear 54, transmits the reverse rotational power directly as it is to the ring gear 54, and this reverse rotational power is further transmitted to the gear rack 52 via the planet gears 53, the roller clutch 17 is actuated, and the hub body is braked.

FIGS. 15 through 20 illustrate another embodiment of the three-speed internal hub with a coaster brake unit pertaining to the present invention. In the previous embodiment, the power from the clutch body in the high speed step was transmitted from the gear rack to the hub body via the ring gear, the power from the clutch body in the medium speed step was transmitted directly to the hub body via the gear rack, and the power from the clutch body in the low speed step was transmitted from the ring gear to the hub body via the gear rack. In this embodiment, the power from the clutch body in the high speed step is transmitted from the gear rack to the hub body via the ring gear, the power from the clutch body in the medium speed step is transmitted directly to the hub body via the ring gear, and the power from the clutch body in the low speed step is transmitted from the ring gear to the hub body via the gear rack. Therefore, only in the case of reverse drive in the high speed step is the engagement component 67 of the clutch body 6 moved by the inclined guide surface 7, which is the forced movement means, and fitted into the serrations 54a of the ring gear 54.

The structural members in this embodiment are essentially the same as those in the previous embodiment, with the only differences being that the shapes and dimensions of the gear rack 52, the ring gear 54, and the clutch body 6 are changed so that the engagement component 67 of the clutch body 6 will engage with the serrations 54a of the ring gear 54 in the intermediate position, and that the shape and dimensions of the clutch body 6 are changed so that only when the clutch body 6 has been moved to the second position does the step 68 of the second clutch member 65 acts on the oscillating pawl 16a of the pawl clutch 16 to disengage the oscillating pawl 16a and the ratchet 44. Because of this similarity, the same numbering is used in the figures for the various members as in the previous embodiment.

The operation of the three-speed internal hub with a coaster brake unit in this other embodiment will now be described.

Figure 15:
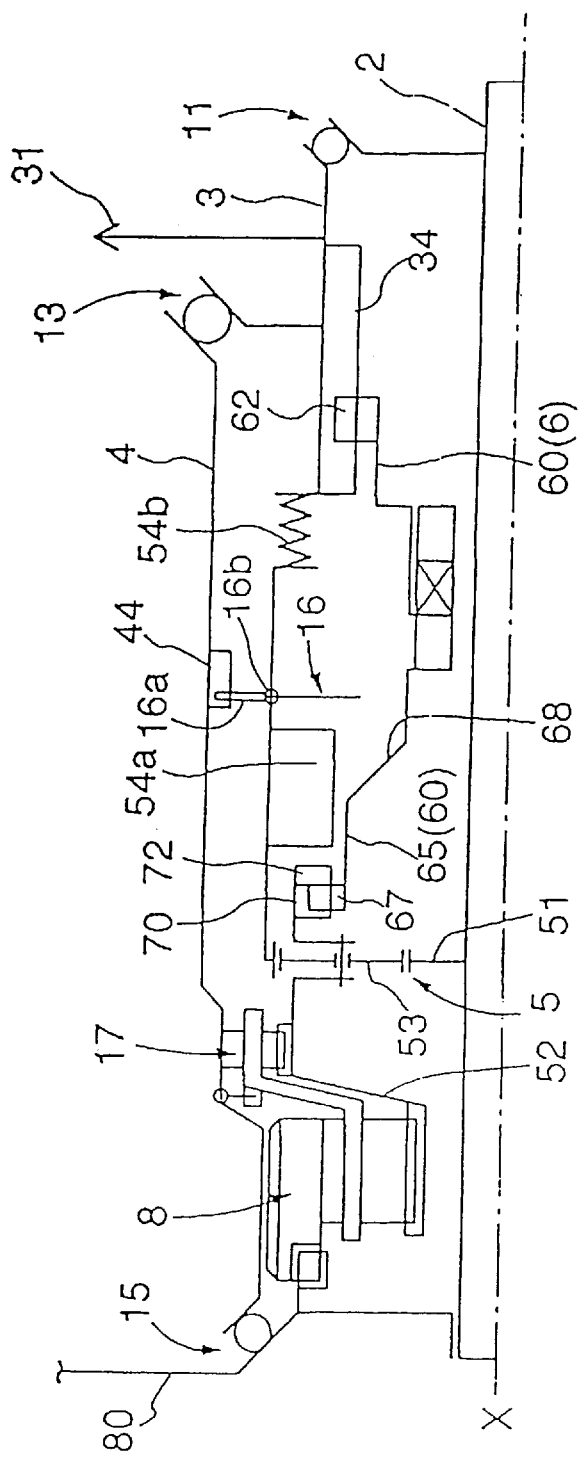
FIG. 15 is a schematic view of an alternative embodiment of an internally mounted bicycle transmission which includes a coaster brake unit in a high speed state.
Figure 18:
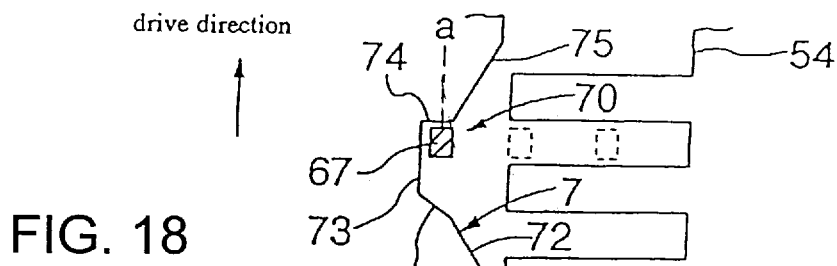
FIG. 18 is a detailed diagram showing the position of an engagement component of a clutch in relation to a depression formed in the gear rack and a serration formed in a ring gear when the transmission in FIG. 15 is in a high speed state.

The high speed step can be realized by setting the clutch body 6 to the first position. This state is shown in FIGS. 15 and 18. The forward rotational power, the reverse rotational power, and the transmission paths thereof are all the same as in the previous embodiment, so their description will be omitted here.

Figure 16:
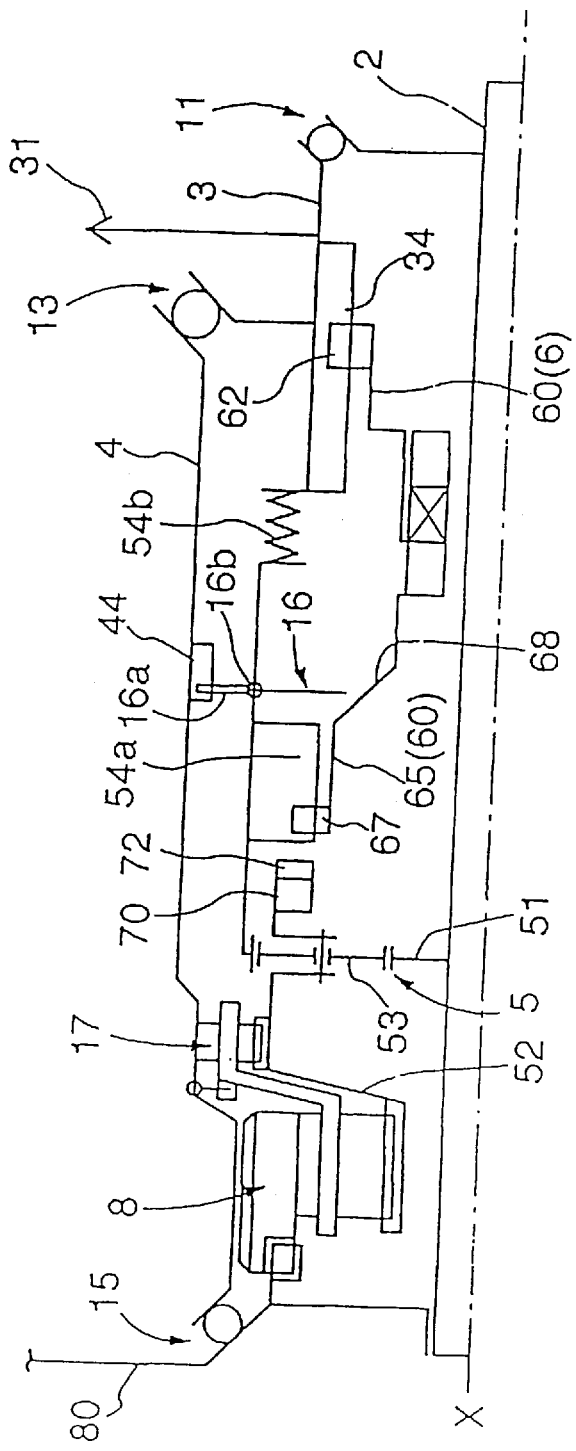
FIG. 16 is a schematic view of the transmission shown in FIG. 15 in a medium speed state.
Figure 19:
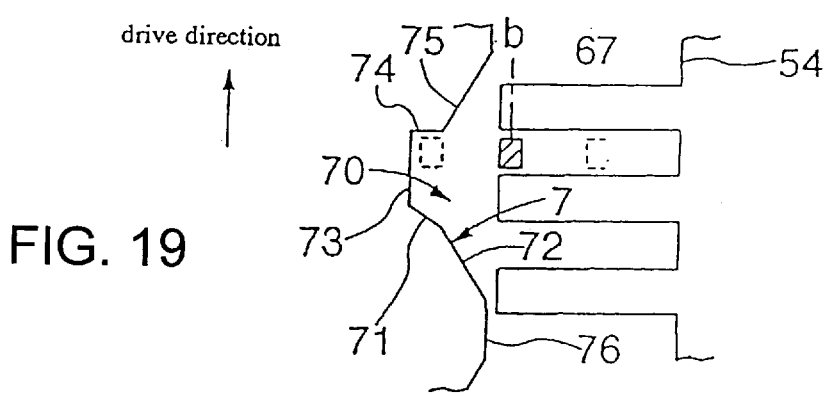
FIG. 19 is a detailed diagram showing the position of an engagement component of a clutch in relation to a depression formed in the gear rack and a serration formed in a ring gear when the transmission in FIG. 15 is in a medium speed state.

The medium speed step can be realized by setting the clutch body 6 to an intermediate position between the first position and the second position. This state is shown in FIGS. 16 and 19. The forward rotational power received by the driver 3 through the chain is transmitted via the clutch body 6 to the ring gear 54, which is engaged with the engagement component 67 of the clutch body 6. Since the oscillating pawl 16a of the pawl clutch 16 is not in contact with the step 68 of the second clutch member 65, it remains engaged with the ratchet 44. Accordingly, the forward rotational power imparted to the ring gear 54 is transmitted directly as it is to the hub body 4 via the pawl clutch 16. When the pedal is turned backward in this state in order to brake, the engagement component 67, which has already entered the serrations 54a of the ring gear 54, transmits the reverse rotational power directly as it is to the ring gear 54, and this reverse rotational power is further transmitted to the gear rack 52 via the planet gears 53, the roller clutch 17 is actuated, and the hub body is braked.

Figure 17:
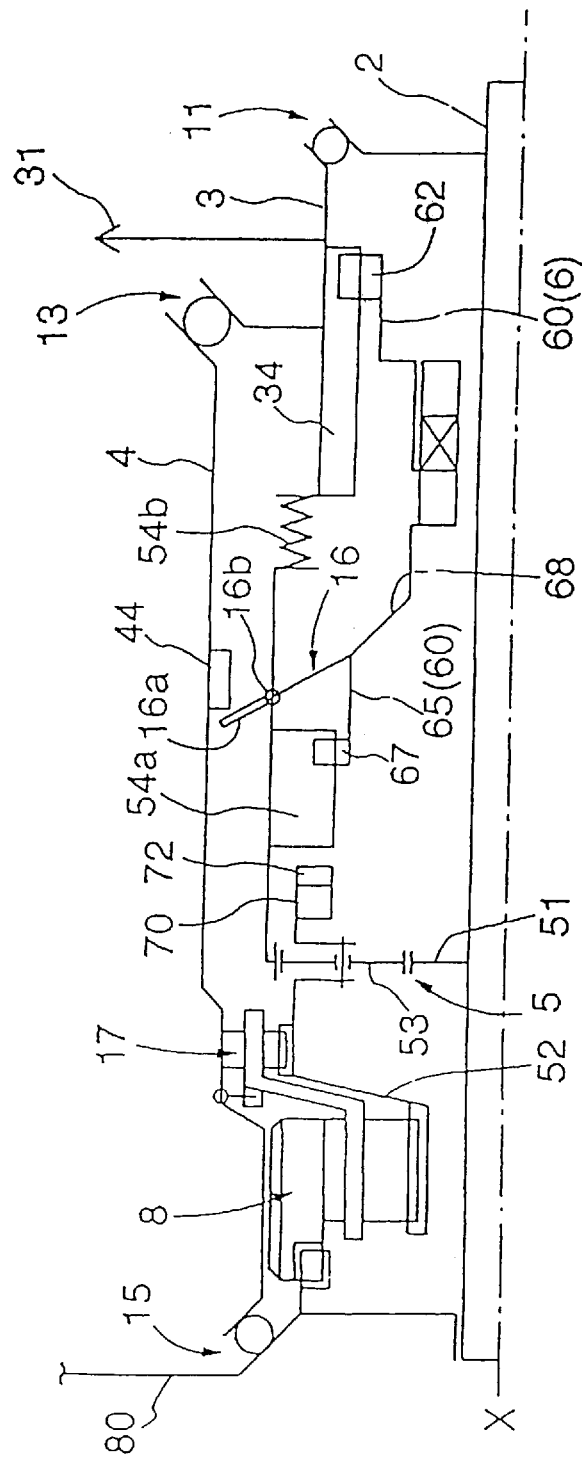
FIG. 17 is a schematic view of the transmission shown in FIG. 15 in a low speed state.
Figure 20:
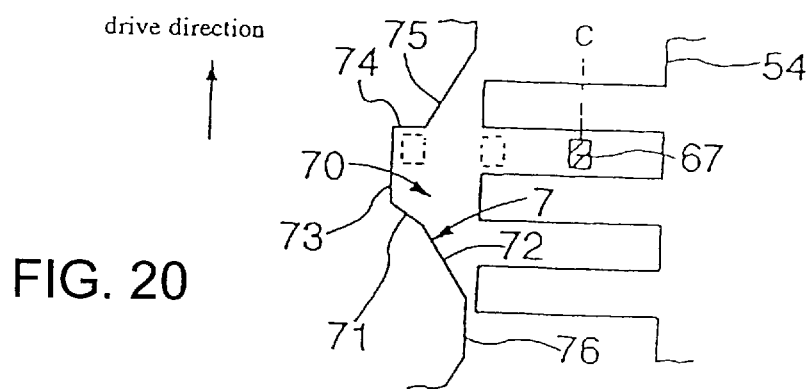
FIG. 20 is a detailed diagram showing the position of an engagement component of a clutch in relation to a depression formed in the gear rack and a serration formed in a ring gear when the transmission in FIG. 15 is in a low speed state.

The low speed step can be realized by setting the clutch body 6 to the second position. This state is shown in FIGS. 17 and 20. In this position, the oscillating pawl 16a of the pawl clutch 16 is separated from the ratchet 44 by the step 68 of the second clutch member 65. Accordingly, the forward rotational power, the reverse rotational power, and the transmission paths thereof are all the same as in the previous embodiment, and their description will be omitted here.

Because of the above, when the pedals are driven backward in order to brake, the clutch body 6 is always engaged with the ring gear 54, so the roller brake 8 can be actuated at a uniform level of torque regardless of whether the bicycle is ridden in the high speed step, the medium speed step, or the low speed step.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

WHAT IS CLAIMED IS:

1. A hub transmission with a coaster brake unit comprising:

a hub axle (2);
   a drive member (3) rotatably mounted around the hub axle (2);
   a hub body (4) rotatably mounted around the hub axle (2);
   a planetary gear mechanism (5) coupled between the drive member (3) and the hub body (4) for communicating rotational force from the drive member (3) to the hub body (4) through multiple rotational force transmission paths, the planetary gear mechanism (5) including:
      a planet gear (53) supported by a planet gear rack (52) for rotation around the hub axle (2);
      wherein the gear rack (52) includes a depression (70) formed in a peripheral direction thereof,
      a ring gear (54) engaging the planet gear (53); and
      wherein the ring gear (54) includes a serration (54a) formed in a peripheral direction thereof;
   a clutch (6) movable in a direction of an axis (X) of the axle (2) between a first position (a) and a second position (c), wherein the clutch (6) includes an engagement component (67);
   wherein the engagement component (67) engages with the depression (70) in the gear rack (52) for transmitting forward rotational power to the gear rack (52) when the clutch (6) is located in the first position (a);
   wherein the engagement component (67) engages with the serration (54a) in the ring gear (54) for transmitting forward rotational power to the ring gear (54) when the clutch (6) is located in the second position (c); and
   forcible movement means (7) for forcibly moving the clutch (6) from the depression (70) toward the serration (54a) so that the engagement component (67) engages with the serration (54a) when the clutch (6) is located in the first position (a) and the engagement component (67) engages with the depression (70) in the gear rack (52) for transmitting forward rotational power to the gear rack (52) and reverse rotational power is then applied to the drive member (3).

2. The hub transmission according to claim 1 wherein the forcible movement means (7) comprises an inclined surface (71,72) formed in the gear rack (52) for contacting the engagement component (67) and pushing the clutch (6) toward the serration (54a) when reverse rotational power is applied to the drive member (3).

3. The hub transmission according to claim 2 wherein the forcible movement means (7) comprises a first inclined surface (71) and a second inclined surface (72), both of which are formed in the gear rack (52) adjacent to each other for contacting the engagement component (67) and pushing the clutch (6) toward the serration (54a) when reverse rotational power is applied to the drive member (3).

4. The hub transmission according to claim 3 wherein the second inclined surface (72) has a greater inclination than the first inclined surface (71).

5. The hub transmission according to claim 3 wherein the second inclined surface (72) has the same inclination as the first inclined surface (71) and forms a continuous transition with the first inclined surface (71).

6. The hub transmission according to claim 3 wherein the depression (70) is defined by a side surface (74) and a bottom surface (73) formed on an annular portion of the gear rack (52).

7. The hub transmission according to claim 6 wherein the first inclined surface (71) is located adjacent to the bottom surface (73).

8. The hub transmission according to claim 6 wherein the serration (54a) is formed on an annular portion of the ring gear (54).

9. The hub transmission according to claim 2 wherein the depression (70) is defined by a side surface (74) and a bottom surface (73) formed on an annular portion of the gear rack (52), and wherein the inclined surface (71,72) is located adjacent to the bottom surface (73).

10. The hub transmission according to claim 1 wherein the ring gear (54) is movable in the direction of the axis (X) of the axle (2), and further comprising ring gear biasing means (54b) for biasing the ring gear (54) toward the gear rack (52).

11. The hub transmission according to claim 1 further comprising a first one-way transmission mechanism (16) disposed between the ring gear (54) and the hub body (4), and wherein the first one-way transmission mechanism (16) is structured for transmitting rotational force from the drive member (3) to the hub body (4) when the clutch (6) is located in the first position (a).

12. The hub transmission according to claim 11 wherein the clutch (6) includes a transmission disabling member (68) for disabling the first one-way transmission mechanism (16) when the clutch (6) is located in an intermediate position (b) between the first position (a) and the second position (c), and further comprising a second one-way transmission mechanism (17) disposed between the gear rack (52) and the hub body (4), wherein the second one-way transmission mechanism (17) is structured for transmitting rotational force from the drive member (3) to the hub body (4) when the clutch is located in the intermediate position (b).

13. The hub transmission according to claim 12 wherein the transmission disabling member (68) disables the first one-way transmission mechanism (16) when the clutch (6) is located in the second position (c), and wherein the second one-way transmission mechanism (17) is structured for transmitting rotational force from the drive member (3) to the hub body (4) when the clutch is located in the second position (c).

14. The hub transmission according to claim 11 wherein the engagement component (67) engages with the serration (54a) in the ring gear (54) for transmitting forward rotational power to the ring gear (54) when the clutch (6) is located in an intermediate position (b) between the first position (a) and the second position (c), and wherein the first one-way transmission mechanism (16) is structured for transmitting rotational force from the drive member (3) to the hub body (4) when the clutch is located in the intermediate position (b).

15. The hub transmission according to claim 14 wherein the clutch (6) includes a transmission disabling member (68) for disabling the first one-way transmission mechanism (16) when the clutch (6) is located in the second position (c), and further comprising a second one-way transmission mechanism (17) disposed between the gear rack (52) and the hub body (4), wherein the second one-way transmission mechanism (17) is structured for transmitting rotational force from the drive member (3) to the hub body (4) when the clutch is located in the second position (c).

16. A hub transmission with a coaster brake unit comprising:
   a hub axle (2);
   a drive member (3) rotatably mounted around the hub axle (2);
   a hub body (4) rotatably mounted around the hub axle (2);
   a planetary gear mechanism (5) coupled between the drive member (3) and the hub body (4) for communicating rotational force from the drive member (3) to the hub body (4) through multiple rotational force transmission paths, the planetary gear mechanism (5) including:
      a planet gear (53) supported by a planet gear rack (52) for rotation around the hub axle (2);
      wherein the gear rack (52) includes a plurality of depressions (70) formed in a peripheral direction thereof;
      a ring gear (54) engaging the planet gear (53); and
      wherein the ring gear (54) includes a plurality of serrations (54a) formed in a peripheral direction thereof;
   a clutch (6) movable in a direction of an axis (X) of the axle (2) between a first position (a) and a second position (c), wherein the clutch (6) includes an engagement component (67);
   wherein the engagement component (67) engages with at least one of the plurality of depressions (70) in the gear rack (52) for transmitting forward rotational power to the gear rack (52) when the clutch (6) is located in the first position (a);
   wherein the engagement component (67) engages with at least one of the plurality of serrations (54a) in the ring gear (54) for transmitting forward rotational power to the ring gear (54) when the clutch (6) is located in the second position (c); and
   forcible movement means (7) for forcibly moving the clutch (6) from the plurality of depressions (70) toward the plurality of serrations (54a) so that the engagement component (67) engages with the serration (54a) when the clutch (6) is located in the first position (a) and the engagement component (67) engages with the depression (70) in the gear rack (52) for transmitting forward rotational power to the gear rack (52) and reverse rotational power is then applied to the drive member (3).

17. The hub transmission according to claim 16 wherein the forcible movement means (7) comprises an inclined surface (71,72) formed in the gear rack (52) for contacting the engagement component (67) and pushing the clutch (6) toward the plurality of serrations (54a) when reverse rotational power is applied to the drive member (3).

18. The hub transmission according to claim 17 wherein the forcible movement means (7) comprises a first inclined surface (71) and a second inclined surface (72), both of which are formed in the gear rack (52) adjacent to each other for contacting the engagement component (67) and pushing the clutch (6) toward the serration (54a) when reverse rotational power is applied to the drive member (3).

19. The hub transmission according to claim 18 wherein the second inclined surface (72) has a greater inclination than the first inclined surface (71).

20. The hub transmission according to claim 18 wherein the second inclined surface (72) has the same inclination as the first inclined surface (71) and forms a continuous transition with the first inclined surface (71).

21. The hub transmission according to claim 17 wherein each of the plurality of depressions (70) is defined by a side surface (74) and a bottom surface (73) formed in a peripheral direction on an annular portion of the gear rack (52).

22. The hub transmission according to claim 21 further comprising a plurality of the inclined surfaces (71,72), wherein one of the plurality of inclined surfaces (71) is located adjacent to each bottom surface (73).

23. The hub transmission according to claim 22 wherein the plurality of serrations (54a) are formed in a peripheral direction on an annular portion of the ring gear (54).

24. The hub transmission according to claim 23 wherein each inclined surface (71,72) includes a first inclined surface (71) and a second inclined surface (72) located adjacent to the first inclined surface (71), and further comprising a third surface (76) adjacent to each second inclined surface (72) and inclined relative to the second inclined surface (72), wherein a distance (D1) of the second inclined surface (72) and the third surface (76) of each depression (70) in the peripheral direction is greater than a pitch (D2) in the peripheral direction of the plurality of serrations (54a).

25. The hub transmission according to claim 16 wherein the ring gear (54) is movable in the direction of the axis (X) of the axle (2), and further comprising ring gear biasing means (54b) for biasing the ring gear (54) toward the gear rack (52).

26. The hub transmission according to claim 16 further comprising a first one-way transmission mechanism (16) disposed between the ring gear (54) and the hub body (4), and wherein the first one-way transmission mechanism (16) is structured for transmitting rotational force from the drive member (3) to the hub body (4) when the clutch (6) is located in the first position (a).

27. The hub transmission according to claim 26 wherein the clutch (6) includes a transmission disabling member (68) for disabling the first one-way transmission mechanism (16) when the clutch (6) is located in an intermediate position (b) between the first position (a) and the second position (d), and further comprising a second one-way transmission mechanism (17) disposed between the gear rack (52) and the hub body (4), wherein the second one-way transmission mechanism (17) is structured for transmitting rotational force from the drive member (3) to the hub body (4) when the clutch is located in the intermediate position (b).

28. The hub transmission according to claim 27 wherein the transmission disabling member (68) disables the first one-way transmission mechanism (16) when the clutch (6) is located in the second position (d), and wherein the second one-way transmission mechanism (17) is structured for transmitting rotational force from the drive member (3) to the hub body (4) when the clutch is located in the second position (d).

29. The hub transmission according to claim 26 wherein the engagement component (67) engages with the serration (54a) in the ring gear (54) for transmitting forward rotational power to the ring gear (54) when the clutch (6) is located in an intermediate position (b) between the first position (a) and the second position (c), and wherein the first one-way transmission mechanism (16) is structured for transmitting rotational force from the drive member (3) to the hub body (4) when the clutch is located in the intermediate position (b).

30. The hub transmission according to claim 29 wherein the clutch (6) includes a transmission disabling member (68) for disabling the first one-way transmission mechanism (16) when the clutch (6) is located in the second position (c), and further comprising a second one-way transmission mechanism (17) disposed between the gear rack (52) and the hub body (4), wherein the second one-way transmission mechanism (17) is structured for transmitting rotational force from the drive member (3) to the hub body (4) when the clutch is located in the second position (c).

31. A hub transmission with a coaster brake unit comprising:

a hub axle (2);

a drive member (3) rotatably mounted around the hub axle (2);

a hub body (4) rotatably mounted around the hub axle (2);

a planetary gear mechanism (5) coupled between the drive member (3) and the hub body (4) for communicating rotational force from the drive member (3) to the hub body (4) through multiple rotational force transmission paths, the planetary gear mechanism (5) including:

a planet gear (53) supported by a planet gear rack (52) for rotation around the hub axle (2);

a ring gear (54) engaging the planet gear (53); and wherein the ring gear (54) includes a serration (54a) formed in a peripheral direction thereof;

a clutch (6) for selectively transmitting rotational force from the drive member (3) to the hub body (4) through the multiple rotational force transmission paths, wherein the clutch (6) includes an engagement component (67); and forcible movement means (7) for forcibly moving the clutch (6) so that the engagement component (67) engages with the serration (54a) when reverse rotational power is applied to the drive member (3) and the clutch (6) is initially positioned for transmitting forward rotational power through each and all of the multiple rotational force transmission paths.

* * * * *